United States Patent
Musukula et al.

[11] Patent Number: 5,813,715
[45] Date of Patent: Sep. 29, 1998

[54] REAR SEAT AND PACKAGE TRAY SUB ASSEMBLY

[75] Inventors: Vijay Musukula; Andrew Massara, both of Southfield; James Masters, Farmington Hills; Philip Leistra, III, Novi; Majid Arefi, Troy; Dan Bateson, Ferndale, all of Mich.

[73] Assignee: Lear Corporation, Southfield, Mich.

[21] Appl. No.: 705,512

[22] Filed: Aug. 29, 1996

Related U.S. Application Data

[60] Provisional application Nos. 60/007,548 Nov. 27, 1995, and 60/016,775 Mar. 7, 1996.

[51] Int. Cl.$^6$ .................................................. B60N 2/00
[52] U.S. Cl. .................................................. 296/63
[58] Field of Search ..................... 296/37.16, 63

[56] References Cited

U.S. PATENT DOCUMENTS

| | | |
|---|---|---|
| 3,446,526 | 5/1969 | Peters . |
| 3,632,157 | 1/1972 | Lehr . |
| 3,799,577 | 3/1974 | Colucci . |
| 4,127,301 | 11/1978 | Syrowik . |
| 4,198,091 | 4/1980 | Appleton . |
| 4,443,034 | 4/1984 | Beggs ................................ 296/37.16 |
| 4,479,675 | 10/1984 | Zankl ................................ 296/37.16 |
| 4,681,367 | 7/1987 | Timmers . |
| 5,011,208 | 4/1991 | Lewallen ........................... 296/37.16 |
| 5,171,054 | 12/1992 | Wilson . |
| 5,286,084 | 2/1994 | Bart . |
| 5,288,122 | 2/1994 | Pilhall ............................... 296/37.16 |
| 5,358,307 | 10/1994 | Shafer et al. . |
| 5,366,270 | 11/1994 | Heussner et al. . |
| 5,492,361 | 2/1996 | Kim . |

*Primary Examiner*—Stephen Avila
*Attorney, Agent, or Firm*—MacMillan, Sobanski & Todd, LLC

[57] ABSTRACT

An automotive rear seat assembly having a seat back with a top and a bottom for supporting the back of an occupant. A package tray extends from the top of the seat back to an outer periphery. A rotational connection is disposed between the package tray and the top of the seat back which pivotally connects the package tray to the seat back. The rear seat assembly may be shipped with the package tray overlying the seat back and installed in a vehicle by rotating the package tray relative to the seat back to a position transverse to the seat back. Accordingly, the package tray and seat back may be installed within the vehicle as one unitary piece.

30 Claims, 6 Drawing Sheets

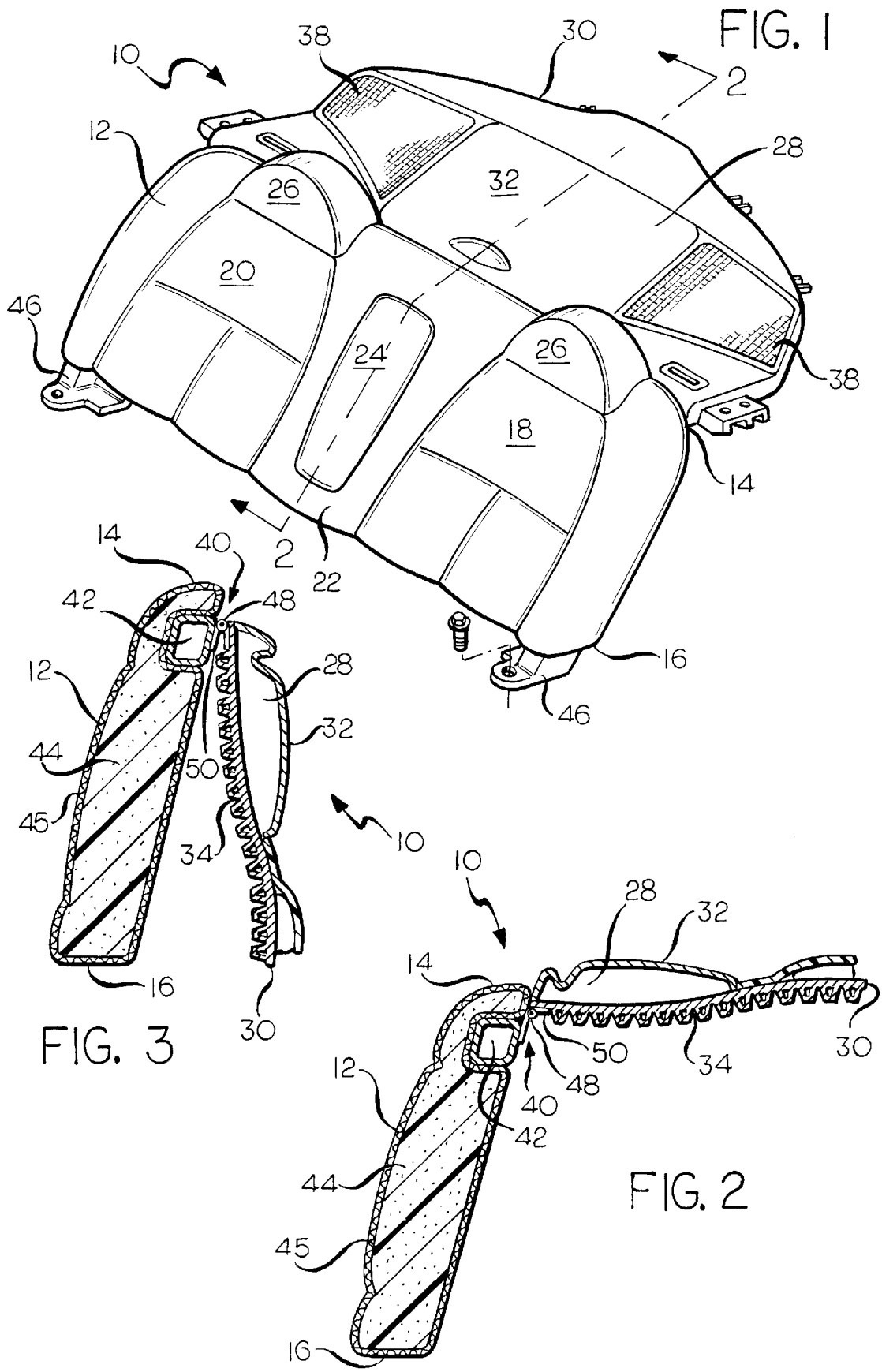

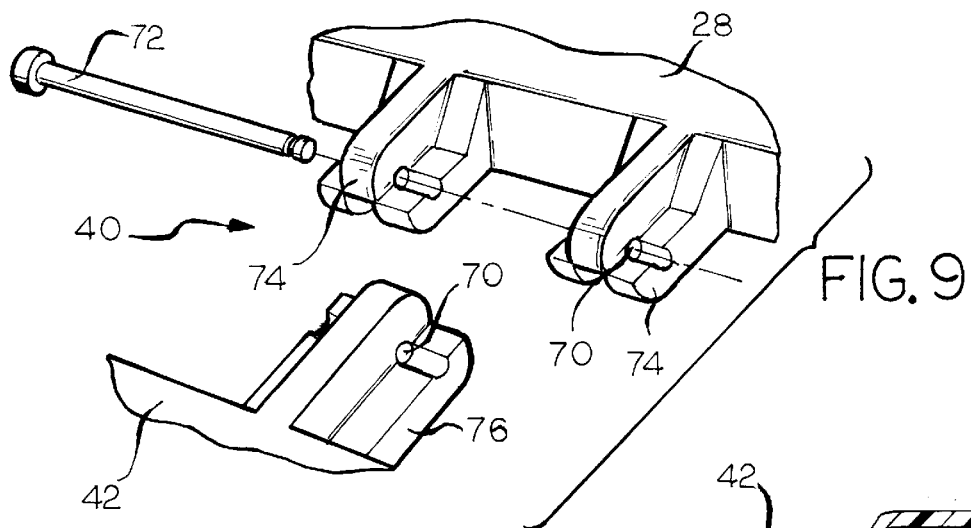
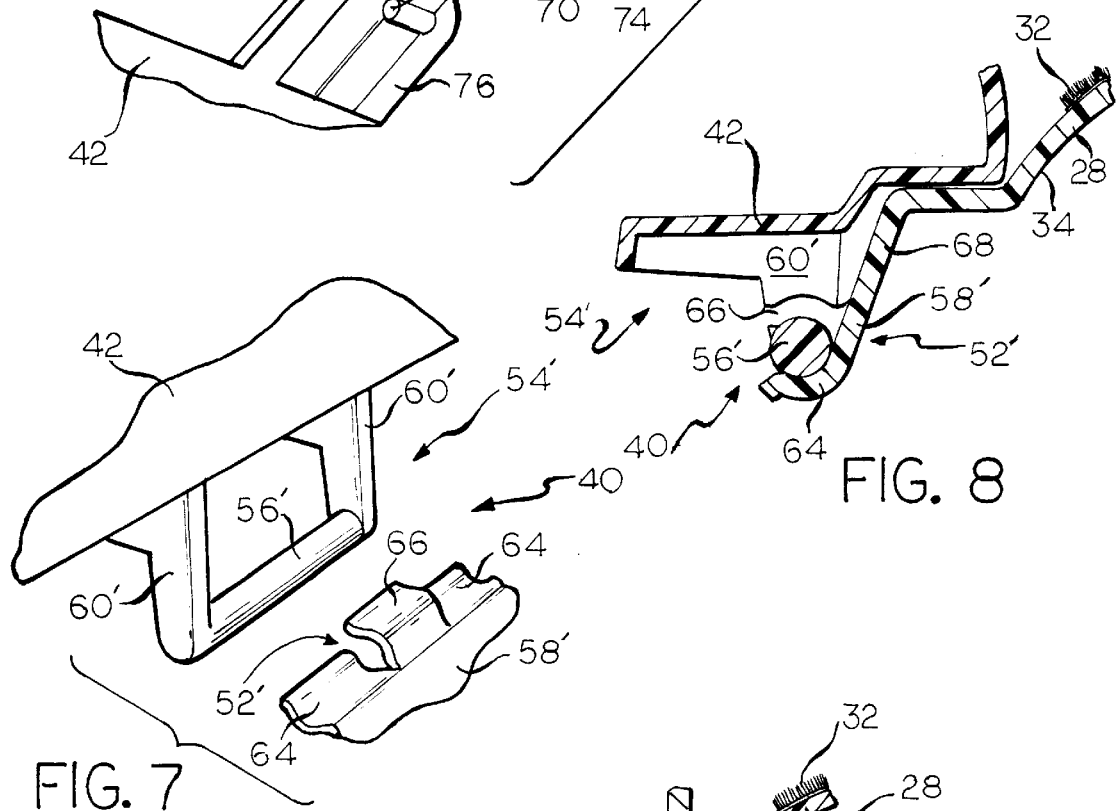
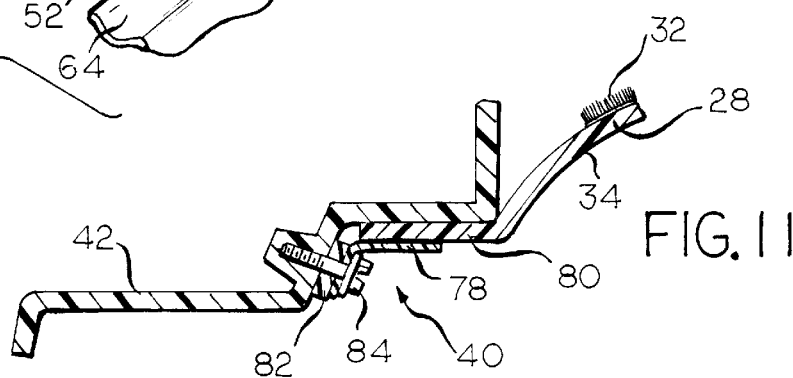
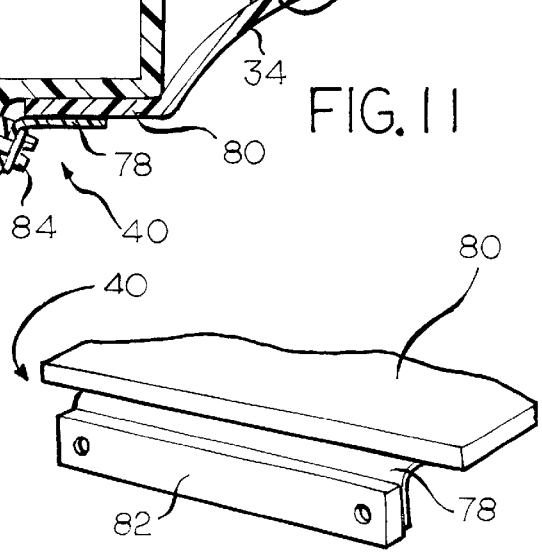

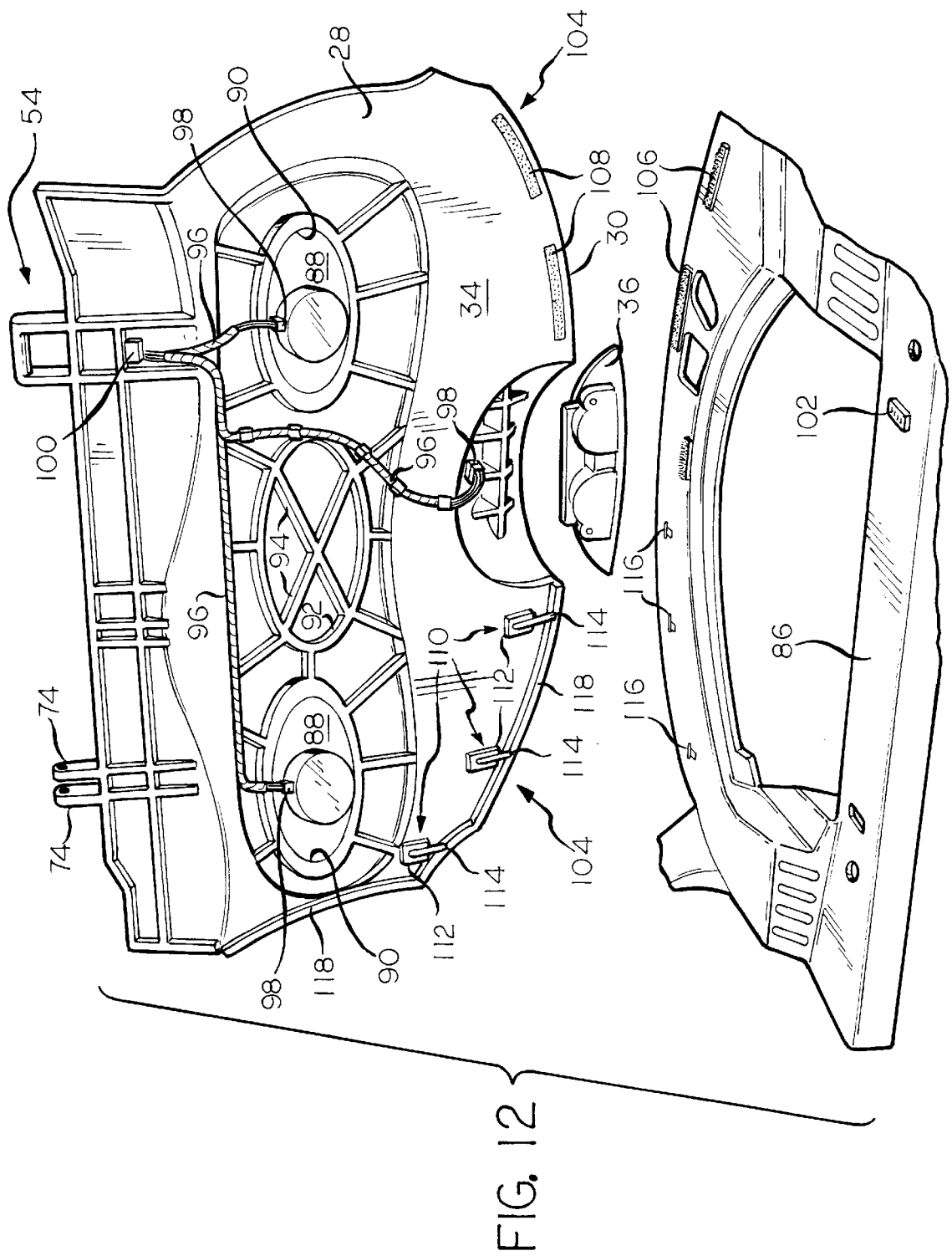

REAR SEAT AND PACKAGE TRAY SUB ASSEMBLY

RELATED APPLICATION

This application claims priority to and all of the benefits of co-pending U.S. provisional patent application Ser. No. 60/007,548 which was filed on Nov. 27, 1995 and is entitled "Modular Vehicle Seat Assembly." This application also claims priority to and all of the benefits of co-pending U.S. provisional patent application entitled "Improved Modular Vehicle Seat Assembly" which was filed on May 7, 1996 and has Provisional Ser. No. 60/016,775.

TECHNICAL FIELD

The subject invention relates to automotive seat assemblies and, more specifically, to a package tray pivotally attached to a rear seat assembly.

BACKGROUND OF THE INVENTION

By way of background, rear seat assemblies typically include a seat bottom and a seat back. The seat back comprises a right and a left seating surface and a center portion positioned between the right and left seating surfaces. The right and left seating surfaces and the center portion of the seat back are usually one unitary piece, i.e., they form a bench-type seat back. The right and left seating surfaces are conformed into numerous shapes, sizes, or configurations depending upon the vehicle model. An armrest may be pivotally disposed within the center portion for selective use by an occupant. Further, stationary or adjustable headrests may be located at the top surface of the seat back. A number of mounting brackets extend downwardly from the seat back for mounting engagement with a vehicle floor pan. These brackets may comprise a pivot hinge which allows the seat back to pivot forwardly toward the seat bottom. This may be desirable if a user wishes to extend the floor of a rear trunk compartment.

Similarly, the seat bottom comprises a right and left seating surface and a center portion positioned between the right and left seating surfaces. The right and left seating surfaces and the center portion of the seat bottom are also one unitary piece. The right and left seating surfaces may also be contoured into any number of shapes, sizes, or configurations. A number of mounting brackets extend from the seat bottom portion for mounting engagement with the seat back and/or the vehicle floor pan.

A package tray, having a curved rear periphery and a substantially flat front face, is typically mounted to the vehicle behind the rear seat assembly. The package tray usually retains numerous devices such as audio speakers, audio headphone jacks, first aid kits, rear tail lights, seat belt mounting plates, and seat belt retractors. The package tray may also be covered by a trim cover material.

Specifically, the rear periphery of the package tray is mounted below a rear window at the juncture of the rear window and the rear trunk compartment, whereby the package tray covers the opening between the rear of the seat back and the trunk compartment. The package tray mounts to the juncture by means of numerous attachment devices. The tray usually includes a number of brackets or mounting holes located within the flat front face. During installation, the package tray is mounted to the vehicle and the necessary devices are then installed in the tray. Some time after the tray is mounted, the separate components of the rear seat assembly are installed within the vehicle. The seat back typically latches to the brackets extending from the package tray or is bolted via the mounting holes to the package tray. Accordingly, the current manufacturing procedure requires at least two (2) separate and distinct steps for mounting the package tray and the seat back within the vehicle.

SUMMARY OF THE INVENTION

An automotive rear seat assembly comprising a seat back having a top and a bottom for supporting the back of an occupant. A package tray extends from the top of the seat back to an outer periphery. A rotational connection is disposed between the tray and the top of the seat back, whereby the rear seat assembly may be shipped with the tray substantially overlying the seat back and installed in a vehicle by rotating the tray relative to the seat back to a position transverse to the seat back.

The subject invention provides a novel assembly whereby the package tray and seat back are installed within the vehicle as one unitary piece.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of a rear seat assembly according to the subject invention;

FIG. 2 is a cross-sectional view taken along line 2—2 of FIG. 1;

FIG. 3 is a view similar to FIG. 2 but showing a package tray pivoting toward a seat back in a partially overlying position;

FIG. 7 is an enlarged perspective view of an alternative embodiment of the rotational connection;

FIG. 8 is a cross-sectional view of the rotational connection of FIG. 7;

FIG. 9 is an enlarged perspective view of another alternative embodiment of the rotational connection;

FIG. 10 is an enlarged perspective view of yet another alternative embodiment of the rotational connection;

FIG. 11 is a cross-sectional view of the rotational connection of FIG. 10;

FIG. 12 is a fragmentary perspective view of the underside of the package tray of FIG. 1 and a vehicle frame;

DETAILED DESCRIPTION OF THE PREFERRED EMBODIMENT

Figure 4:
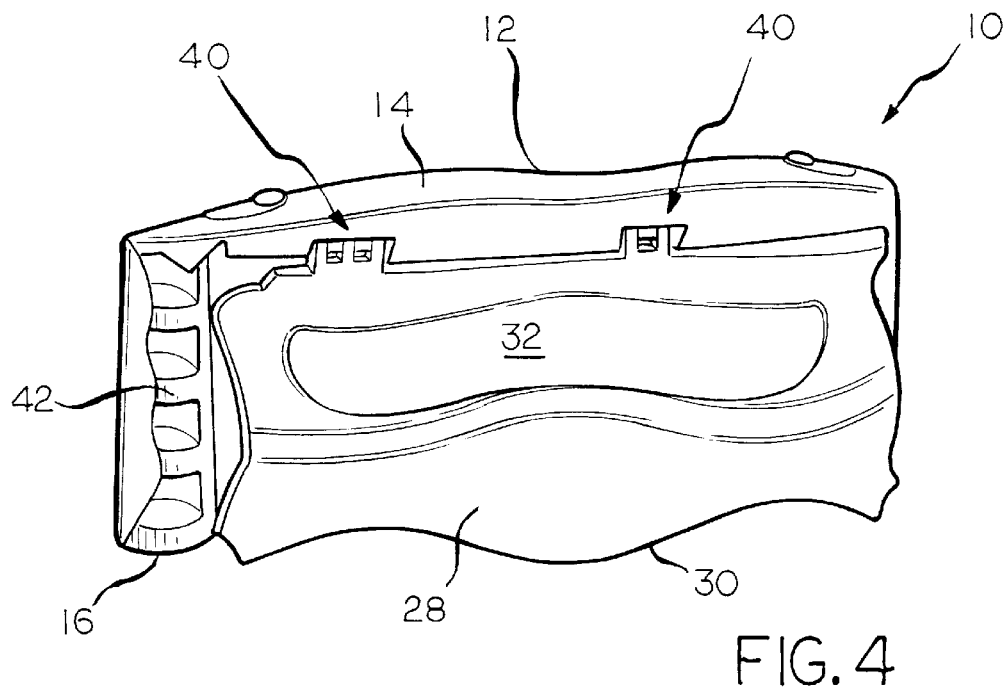
FIG. 4 is a perspective view of the subject invention in a shipping condition.

Referring to the Figures, wherein like numerals indicate like or corresponding parts throughout the several views, an automotive rear seat assembly is generally shown at 10. The rear seat assembly 10 comprises a bench-type seat back 12 having a top 14 and a bottom 16 for supporting the back of an occupant (not shown) and a bench-type seat bottom (not shown) for supporting the bottom of the occupant. Specifically, the seat back 12 comprises a right 18 and a left 20 seating surface and a center portion 22 positioned between the right 18 and left 20 seating surfaces. The right 18 and left 20 seating surfaces and the center portion 22 of the seat back 12 are one unitary piece. The right 18 and left 20 seating surfaces may be contoured into any number of shapes, sizes, or configurations to accommodate various vehicle models. An armrest 24 is pivotally disposed within the center portion 22 of the seat back 12 for selective use by the occupant. Further, stationary or adjustable headrests 26 are located at the top 14 of the seat back 12 for use by the occupant. In addition, other accessories may be added to the rear seat assembly 10, i.e., an integral child seat (not shown), a pair of side impact air bags (not shown), integral storage compartments (not shown), etc.

A package tray 28 extends from the top 14 of the seat back 12 to an outer periphery 30. The package tray 28 has a top surface 32 and a bottom surface 34. A fabric cover may extend over the top surface 32 of the tray 28 to improve the aesthetics of the tray 28. In addition, the top surface 32 may house a rear tail light 36, a number of speaker grills 38, a first aid kit (not shown), or any other appropriate device. A rotational connection, generally depicted at 40, is located between the tray 28 and the top 14 of the seat back 12. As shown in FIGS. 2, 3, and 4, the rear seat assembly 10 may be shipped with the tray 28 substantially overlying the seat back 12 (FIG. 4) and installed in a vehicle (not shown) by rotating the tray 28 relative to the seat back 12 to a position transverse to the seat back 12 (FIG. 2). In other words, during installation of the rear seat assembly 10 into the vehicle, the seat back 12, package tray 28, and all other seat back accessories included in the rear seat assembly 10 are installed as a unitary piece.

The seat back 12 includes a back frame 42 and cushioning material 44 supported by the back frame 42. The cushioning material 44 may be covered by a fabric and/or leather trim cover 45. The rotational connection 40 interconnects the back frame 42 and the tray 28. A number of mounting brackets 46 extend downwardly from the back frame 42 for mounting engagement with a vehicle floor pan (not shown).

One embodiment of the rotational connection 40 is shown in FIGS. 2 and 3 wherein the rotational connection 40 comprises a piano hinge 48 pivotally connected between the back frame 42 and the tray 28. The piano hinge 48 comprises two flat plates 50 each having cylindrical sections located at a distal end thereof. The cylindrical sections are intermeshed with each other with a pin extending therethrough, whereby the two plates 50 are pivotally interconnected. The piano hinge 48 may extend along the entire top 14 of the seat back 12 or any section thereof so long as the hinge 48 provides adequate support for the tray 28.

Figure 6:
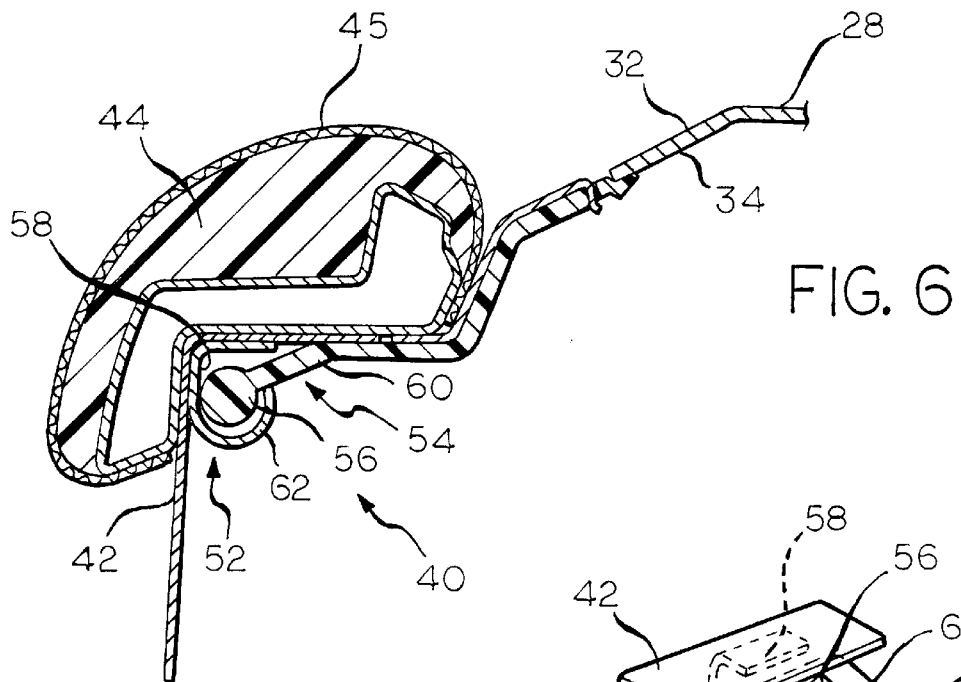
FIG. 6 is a cross-sectional view of the rotational connection of FIG. 5.
Figure 5:
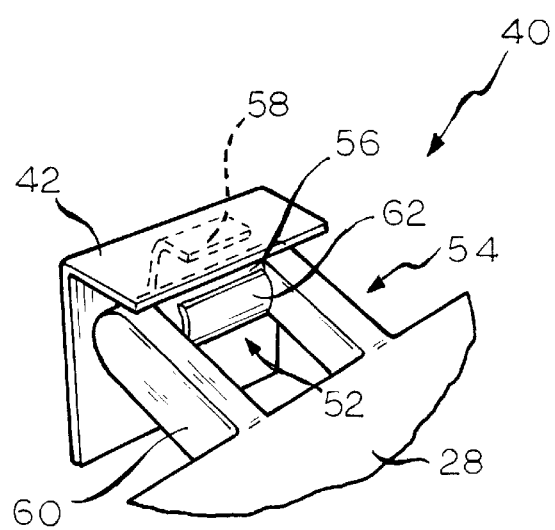
FIG. 5 is an enlarged perspective view of a rotational connection between the seat back and package tray.

Another embodiment of the rotational connection 40 is shown in FIGS. 5 and 6 wherein the rotational connection 40 comprises a pocket, generally depicted at 52, and a bulbous projection, generally depicted at 54. The bulbous projection 54 comprises a cylindrical section 56 and the pocket 52 comprises a clip 58 wherein the cylindrical section 56 is disposed in the clip 58. A pair of support legs 60 extends from the tray 28 and supports the cylindrical section 56 therebetween. The clip 58 includes an inwardly curved hook 62 and is fixedly secured to the back frame 42. More specifically, the cylindrical section 56 extends from the tray 28 and is disposed within the curved hook 62 protruding from the back frame 42, whereby the tray 28 is pivotally secured to the back frame 42. As shown in FIG. 6, the support legs 60 are angled downwardly from the tray 28 to ensure constant engagement with the curved hook 62 when the tray 28 is rotated transverse to the seat back 12. As can be appreciated, the support legs 60 and the cylindrical section 56 could extend from the back frame 42 with the clip 58 secured to the tray 28 without deviating from the scope of the subject invention.

An alternative embodiment of the rotational connection 40 is shown in FIGS. 7 and 8 which is similar to the rotational connection 40 of FIGS. 5 and 6 wherein like numerals having a prime indicate like or corresponding parts. The rotational connection 40 comprises a pocket 52' and a bulbous projection 54' rotatably disposed in the pocket 52'. The bulbous projection 54' comprises a cylindrical section 56' and the pocket 52' comprises a clip 58'. A pair of support legs 60' extend from the back frame 42 and support the cylindrical section 56' therebetween. The clip 58' comprises at least two jaws 64, 66 which retain the cylindrical section 56' therein. More specifically, the cylindrical section 56' extends downwardly from the back frame 42 and is disposed within three jaws 64, 66 protruding from the tray 28, whereby the tray 28 is pivotally secured to the back frame 42. As shown in FIG. 7, the three jaws 64, 66 are configured with two upwardly curved outside jaws 64 and one downwardly curved center jaw 66. The jaws 64, 66 could be configured in any manner so long as they adequately retain the cylindrical section 56' therein. A downwardly angled support plate 68 interconnects the jaws 64, 66 to the tray 28. As can be appreciated, the support legs 60' and the cylindrical section 56' could extend from the tray 28 with the clip 58' secured to the back frame 42 without deviating from the scope of the subject invention.

Yet another embodiment of the rotational connection 40 is shown in FIG. 9 wherein the rotational connection 40 comprises a plurality of overlapping legs 74, 76 each having a bore 70 extending therethrough. A pin 72 passes through the bores 70 which interconnects the legs 74, 76 to form a hinge whereby the legs 74, 76 rotate about the pin 72. As depicted in FIG. 9, two outside legs 74 extend from the tray 28 and one center leg 76 extends from the back frame 42. The center leg 76 fits within the two outside legs 74 such that the bores 70 are aligned with each other. As is apparent to those skilled in the art, there may be any number of legs 74, 76 extending from the tray 28 or the back frame 42 so long as a hinge can be formed.

An additional embodiment of the rotational connection 40 is shown in FIGS. 10 and 11 wherein the rotational connection 40 comprises a material 78 affixed at one end to the tray 28 and at the other end to the back frame 42. Specifically, the material 78 is adhered to a flange 80 extending from the tray 28 at one end and adhered to an attachment bracket 82 at the other end. The attachment bracket 82 in turn is mounted to the back frame 42 via a screw 84. The material 78 may be made of any flexible material such as woven cloth, rubber, or the like so long as the material 78 can bend to provide a pivotal connection between the tray 28 and the seat back 42.

The bottom surface 34 of the package tray 28 is shown in greater detail in FIG. 12. Also shown in FIG. 12 is a fragmentary view of a vehicle frame 86. The tray 28 defines a number of open cavities 90, 92 which can house audio speakers of various sizes or other appropriate devices. Specifically shown in FIG. 12 are two 6×9 audio speakers 88 housed in a pair of outside cavities 90 wherein a center cavity 92 has support beams 94 extending therethrough. Each audio speaker 88 includes electrical leads 96 with connectors 98 for connection to a first box 100 of a wiring harness located on the tray 28. A second or corresponding box 102 is located on the vehicle frame 86 for engagement with the first box 100 when the tray 28 is installed. The rear tail light 36 is also supported by the tray 28 and includes electrical leads 96 with connectors 98 for connection to the first box 100 of the wiring harness on the tray 28. The bulbous projection 54 shown in FIGS. 5 and 6 and the legs 74 shown in FIG. 9 are shown attached to the tray 28 as purely representative of the rotational connection 40. As can be appreciated any number of the rotational connections 40 disclosed could be affixed to the tray 28. Further, the package tray 28 may be shaped in any manner and house any number of devices without deviating from the scope of the subject invention.

Attachment members, generally depicted at 104, are located along the outer periphery 30 of the tray 28 for attachment to the vehicle frame 86. Two embodiments of the attachment members 104 are shown in FIG. 12. The first embodiment is a plurality of hook and loop fasteners 106, 108 located along the outer periphery 30 of the tray 28. The hook and loop fasteners 106, 108 comprise a hook section 106 and a loop section 108 which are glued, adhered, or otherwise affixed to the tray 28 and to the vehicle frame 86. Either the hook section 106 or the loop section 108 may be affixed to the tray 28 wherein the corresponding hook section 106 or loop section 108 is affixed to the vehicle frame 86. The second embodiment is a plurality of outwardly projecting fingers generally depicted at 110.

Figure 13:
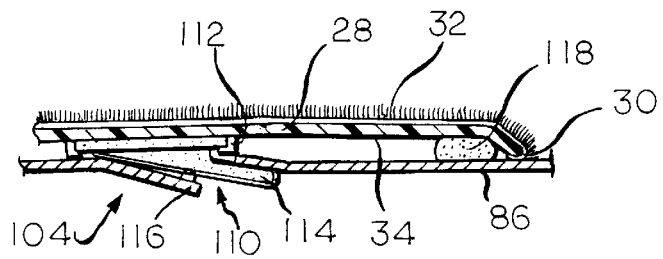
FIG. 13 is a cross-sectional view of an attachment device between the package tray and the vehicle frame of FIG. 12.

A cross-sectional view of the outwardly projecting fingers 110 is also shown in FIG. 13. An attachment plate 112 is locked within the tray 28 whereby the fingers 110 extend from the attachment plate 112. Specifically, the fingers 110 are round retainer pegs 114 that extend downwardly and outwardly in a substantially acute angle from the tray 28. The retainer pegs 114 engage a corresponding aperture 116 located within the vehicle frame 86 when the tray 28 is installed in the vehicle (FIG. 13). A foam strip 118 is mounted along the outer periphery 30 of the tray 28 outside the distal end of the retainer pegs 114 which provides additional support for the outer periphery 30 of the tray 28.

Figure 14:
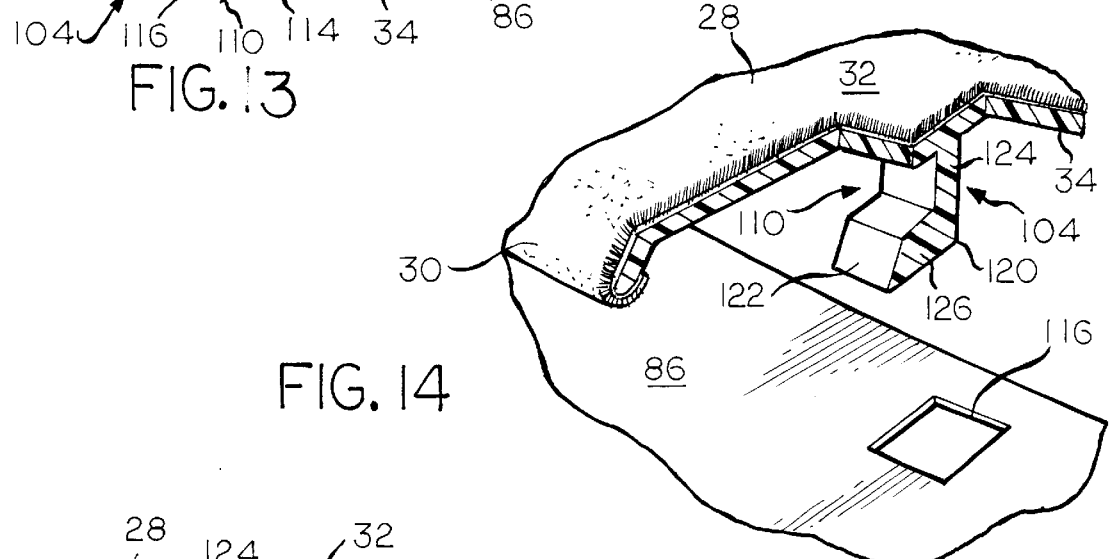
FIG. 14 is a fragmentary perspective view of an alternative embodiment of the attachment device.
Figure 15:
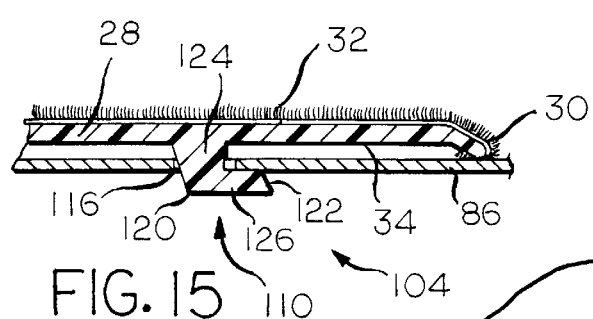
FIG. 15 is a cross-sectional view of the attachment device of FIG. 14.

An alternative embodiment of the outwardly projecting fingers 110 is shown in FIGS. 14 and 15 which is similar to the outwardly projecting fingers 110 of FIGS. 12 and 13. The outwardly projecting fingers 110 comprise a number of L-shaped fingers 120 that include sloping front surfaces 122. Specifically, the L-shaped fingers 120 have a long leg 124 extending downwardly and substantially perpendicular from the tray 28. A short leg 126 extends outwardly from the long leg 124 in a substantially parallel direction to the tray 28. The L-shaped fingers 120 engage the corresponding aperture 116 located within the vehicle frame 86 when the tray 28 is installed in the vehicle (FIG. 15).

Figure 16:
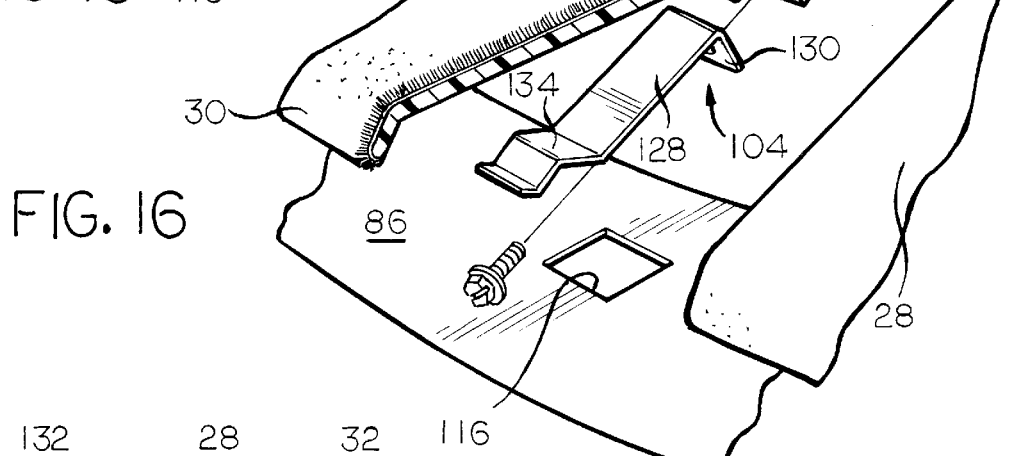
FIG. 16 is a fragmentary perspective view of another alternative embodiment of the attachment device.
Figure 17:
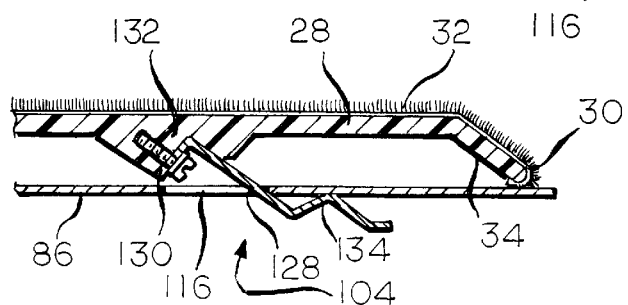
FIG. 17 is a cross-sectional view of the attachment device of FIG. 16.

Yet another embodiment of the attachment members 104 is shown in FIGS. 16 and 17 wherein the attachment members 104 comprise a plurality of cantilevered hooks 128 affixed to the tray 28. Each cantilevered hook 128 has a first end 130 which is bent to cooperate with an abutment 132 in the tray 28. Specifically, the first end 130 is bolted or otherwise attached to the abutment 132. Each cantilevered hook 128 also includes an upwardly bent second end 134, whereby the upwardly bent second ends 134 extend through the corresponding aperture 116 in the vehicle frame 86 when the tray 28 is installed in the vehicle (FIG. 17). These upwardly bent second ends 134 engage the inside surface of the vehicle frame 86 which prevents any upward movement of the tray 28.

Figure 18:
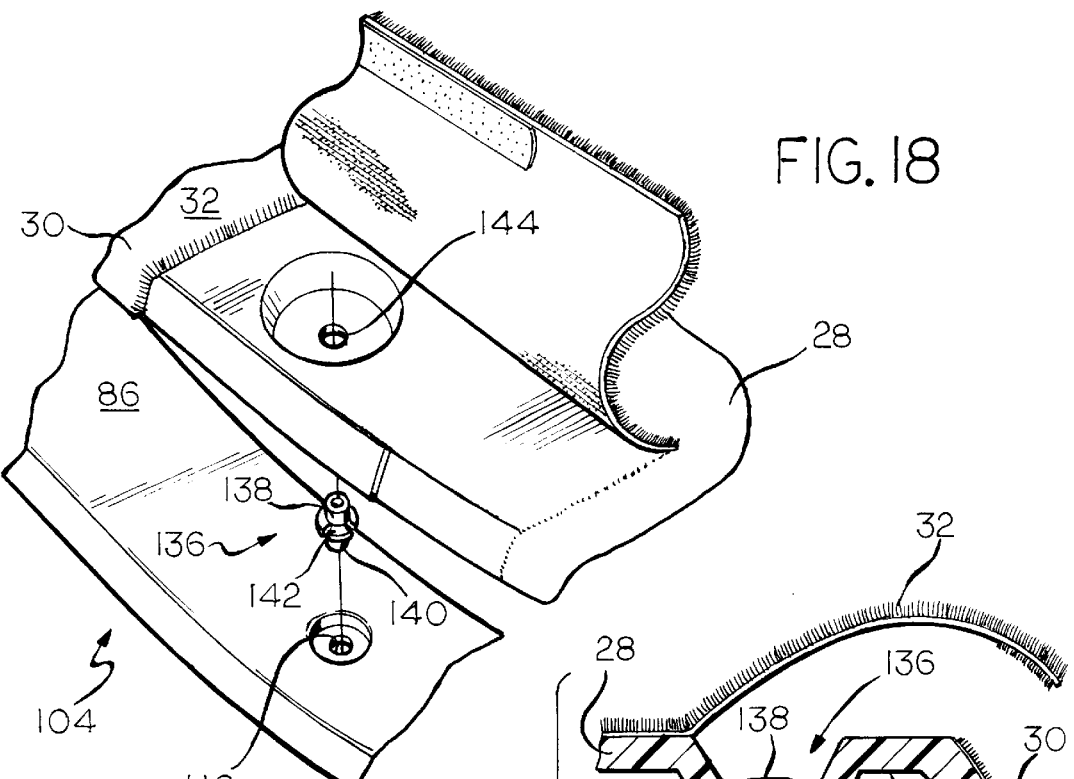
FIG. 18 is a fragmentary perspective view of yet another alternative embodiment of the attachment device.
Figure 19:
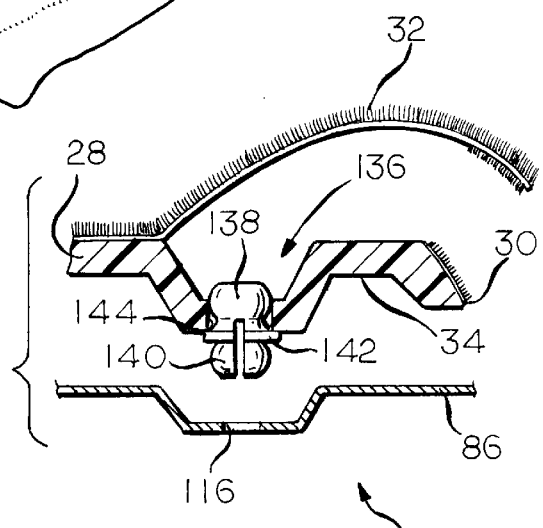
FIG. 19 is a cross-sectional view of the attachment device of FIG. 18.

Another embodiment of the attachment members 104 is shown in FIGS. 18 and 19 wherein the attachment members 104 comprise a plurality of snap-in fasteners which are generally depicted at 136. The snap-in fasteners 136 each have a top bead 138 and a bottom bead 140 with a circular ridge 142 separating the two beads 138, 140. The bottom bead 140 is split into at least two sides whereby the sides can move with resect to each other. The top bead 138 of the snap-in fasteners 136 engages an aperture 144 located within the tray 28. Specifically, the top bead 138 extends partially through the aperture 144 and the ridge 142 abuts the bottom surface 34 of the tray 28. The bottom bead 140 of the snap-in fasteners 136 engages the corresponding apertures 116 in the vehicle frame 86 when the tray 28 is installed in the vehicle.

Figure 20:
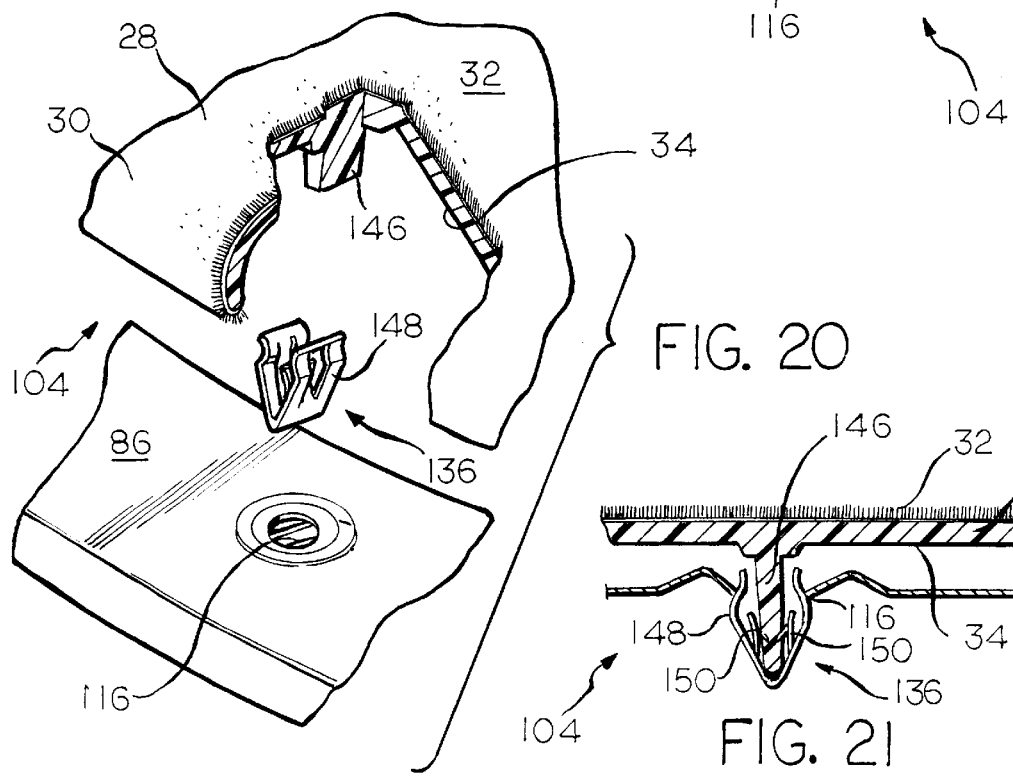
FIG. 20 is a fragmentary perspective view of yet another alternative embodiment of the attachment device.
Figure 21:
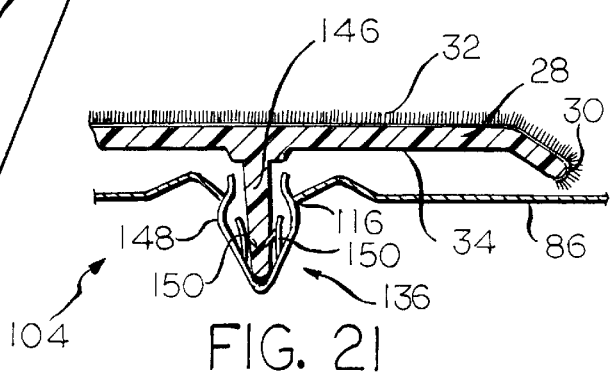
FIG. 21 is a cross-sectional view of the attachment device of FIG. 20.

An alternative embodiment of the snap-in fasteners 136 is shown in FIGS. 20 and 21 which is similar to the snap-in fasteners 136 of FIGS. 18 and 19. A downwardly projecting flange 146 extends from the tray 28 wherein the snap-in fasteners 136 have V-shaped sides 148 and engage the downwardly projecting flange 146. Specifically, a pair of interior clasps 150 engages the flange 146 and retains the V-shaped snap-in fastener 136 in position. The V-shaped snap-in fasteners 136 also engage the corresponding apertures 116 in the vehicle frame 86 when the tray 28 is installed in the vehicle (FIG. 21).

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An automotive rear seat assembly comprising:

a seat back having a top and a bottom for supporting the back of an occupant, said seat back including a back frame and cushioning material supported by said back frame, a package tray extending from said top of said seat back to an outer periphery, a rotational connection between said tray and said top of said seat back, said rotational connection interconnecting said back frame and said tray, and attachment members along said outer periphery of said tray for attachment to a vehicle, whereby said rear seat assembly may be shipped with said tray substantially overlying said seat back and installed in a vehicle by rotating said tray relative to said set back to a position transverse to said seat back.

2. An assembly as set forth in claim 1 including a fabric cover on said tray.

3. An assembly as set forth in claim 1 wherein said rotational connection comprises a piano hinge.

4. An assembly as set forth in claim 1 wherein said rotational connection comprises a pocket and a bulbous projection rotatably disposed in said pocket.

5. An assembly as set forth in claim 4 wherein said bulbous projection comprises a cylindrical section and said pocket comprises a clip.

6. An assembly as set forth in claim 5 including support legs supporting said cylindrical section.

7. An assembly as set forth in claim 6 wherein said support legs extend from said tray.

8. An assembly as set forth in claim 6 wherein said support legs extend from said back frame.

9. An assembly as set forth in claim 5 wherein said clip comprises an inwardly curved hook surrounding and supporting said cylindrical section.

10. An assembly as set forth in claim 5 wherein said clip comprises at least two jaws retaining said cylindrical section.

11. An assembly as set forth in claim 1 wherein said rotational connection comprises a plurality of overlapping legs having a pin extending therethrough whereby said legs form a hinge which rotates about said pin.

12. As assembly as set forth in claim 11 wherein two of said legs extend from said tray and one of said legs extends from said back frame.

13. An assembly as set forth in claim 1 wherein said rotational connection comprises a material affixed at one end to the tray and at the other end to the back frame.

14. An assembly as set forth in claim 13 wherein said material is a flexible material adhered to said tray at one end and adhered to an attachment bracket at the other end.

15. An assembly as set forth in claim 1 including audio speakers supported in said tray.

16. An assembly as set forth in claim 15 wherein said audio speakers include electrical leads with connectors for connection to a wiring harness in the vehicle.

17. An assembly as set forth in claim 1 including a rear tail light supported by said tray.

18. An assembly as set forth in claim 17 wherein said rear tail light includes electrical leads with connectors for connection to a wiring harness in the vehicle.

19. An assembly as set forth in claim 1 wherein said attachment members comprise a hook and loop fastener.

20. An assembly as set forth in claim 1 wherein said attachment members comprise a plurality of outwardly projecting fingers located along said outer periphery of said tray.

21. An assembly as set forth in claim 20 including an attachment plate wherein said fingers are retainer pegs extending from said attachment plate, whereby said retainer pegs engage a corresponding aperture located within the vehicle when said tray is installed in the vehicle.

22. An assembly as set forth in claim 21 including a foam strip mounted along said outer periphery of said tray.

23. An assembly as set forth in claim 20 wherein said fingers are L-shaped and include sloping front surfaces, whereby said L-shaped fingers engage the corresponding aperture located within the vehicle when said tray is installed in the vehicle.

24. An assembly as set forth in claim 1 wherein said attachment members comprise a plurality of cantilevered hooks affixed to said tray and each including an upwardly bent end, whereby said upwardly bent ends of said cantilevered hooks extend through the corresponding aperture in the vehicle when said tray is installed in the vehicle.

25. An assembly as set forth in claim 1 wherein said attachment members comprise a plurality of snap-in fasteners.

26. An assembly as set forth in claim 25 wherein said snap-in fasteners engage an aperture located within said tray, whereby said snap-in fasteners also engage the corresponding apertures in the vehicle when said tray is installed in the vehicle.

27. An assembly as set forth in claim 25 including a downwardly projecting flange extending from said tray wherein said snap-in fasteners are V-shaped and engage said downwardly projecting flange, whereby said V-shaped snap-in fasteners also engage the corresponding apertures in the vehicle when said tray is installed in the vehicle.

28. An automotive rear seat assembly comprising:

a seat back having a top and a bottom for supporting the back of an occupant, said seat back including a back frame and cushioning material supported by said back frame, a package tray extending from said top of said seat back to an outer periphery, and a rotational connection between said tray and said top of said seat back, said rotational connection interconnecting said back frame and said tray, said rotational connection comprising a pocket and a bulbous projection rotatably disposed in said pocket, whereby said rear seat assembly may be shipped with said tray substantially overlying said seat back and installed in a vehicle by rotating said tray relative to said set back to a position transverse to said seat back.

29. An automotive rear seat assembly, comprising:

a seat back having a top and a bottom for supporting the back of an occupant, said seat back including a back frame and cushioning material supported by said back frame, a package tray extending from said top of said seat back to an outer periphery, and a rotational connection between said tray and said top of said seat back, said rotational connection interconnecting said back frame and said tray, said rotational connection comprising a plurality of overlapping legs having a pin extending therethrough, whereby said legs form a hinge which rotates about said pin, whereby said rear seat assembly may be shipped with said tray substantially overlying said seat back and installed in a vehicle by rotating said tray relative to said set back to a position transverse to said seat back.

30. An automotive rear seat assembly, comprising:

a seat back having a top and a bottom for supporting the back of an occupant, said seat back including a back frame and cushioning material supported by said back frame, a package tray extending from said top of said seat back to an outer periphery, and a rotational connection between said tray and said top of said seat back, said rotational connection interconnecting said back frame and said tray, said rotational connection comprising a material affixed at one end to the tray and at the other end to the back frame, whereby said rear seat assembly may be shipped with said tray substantially overlying said seat back and installed in a vehicle by rotating said tray relative to said set back to a position transverse to said seat back.

* * * * *